INVENTOR.
Bengt Erik Ossfeldt
BY Hane and Nydick
Attorneys

June 23, 1970 B. E. OSSFELDT 3,517,174

METHOD OF LOCALIZING A FAULT IN A SYSTEM INCLUDING AT LEAST TWO PARALLELLY WORKING COMPUTERS

Filed Nov. 2, 1966 10 Sheets-Sheet 2

INVENTOR.
Bengt Erik Ossfeldt
BY Hane and Nydick
Attorneys

INVENTOR.
BENGT ERIK OSSFELDT
BY Hane and Nydick
ATTORNEYS

INVENTOR.
Bengt Erik Ossfeldt
BY Hane and Nydick
Attorneys

INVENTOR.
BENGT ERIK OSSFELDT
BY Hane and Nydick
ATTORNEYS

June 23, 1970 B. E. OSSFELDT 3,517,174

METHOD OF LOCALIZING A FAULT IN A SYSTEM INCLUDING AT LEAST TWO PARALLELLY WORKING COMPUTERS

Filed Nov. 2, 1966 10 Sheets-Sheet 6

INVENTOR.
BENGT ERIK OSSFELDT
BY
Hane and Nydick
ATTORNEYS

INVENTOR.
Bengt Erik Ossfeldt
BY Hane and Nydick
Attorneys

INVENTOR.
Bengt Erik Ossfeldt
BY Hane and Nydick
Attorneys

INVENTOR.
Bengt Erik Ossfeldt
BY Hane and Nydick
Attorneys

INVENTOR.
Bengt Erik Ossfeldt
BY
Hane and Nydick
Attorneys

United States Patent Office 3,517,174
Patented June 23, 1970

3,517,174

METHOD OF LOCALIZING A FAULT IN A SYSTEM INCLUDING AT LEAST TWO PARALLELLY WORKING COMPUTERS

Bengt Erik Ossfeldt, Ringdansvagen, Sweden, assignor to Telefonaktiebolaget LM Ericsson, Stockholm, Sweden, a corporation of Sweden Filed Nov. 2, 1966, Ser. No. 591,503
Claims priority, application Sweden, Nov. 16, 1965, 14,761/65
Int. Cl. G06f *11/00*
U.S. Cl. 235—153 5 Claims

ABSTRACT OF THE DISCLOSURE

Two identical computer systems operate in parallel and simultaneously process the same data. The data streams through the computers are continuously compared. When a difference is detected, both computer systems perform the same calculation having a known result. The computer system producing the wrong result is shut down and the other computer system performs another set of calculations with units of the shut down computer system sequentially connected in parallel with corresponding units of the operating computer system. The outputs of the parallelly connected units are monitored for a difference which, when detected, indicates the faulty unit of the shut down computer system.

The present invention concerns a method of localizing a fault in a system including at least two parallelly working computers which have identical central unit and functional units and have a definite type of memory function, and wherein the computers carry out the same calculating operation independently of each other and synchronously so that upon the occurrence of a fault the result of at least one of the computers is correct.

In a computer system of the mentioned type where different types of memory functions are carried out by physically separate functional units it is important to be able to determine, as rapidly as possible, not only which one of the computers is faulty but also which one of the functional units has caused the fault in the faulty computer so that this unit can be disconnected and the remaining parts can continue their normal function even during the time during which the faulty unit is examined and repaired or replaced.

Briefly, the invention contemplates a method for localizing a faulty unit in a pair of identical compuiter systems each having a central processing unit connected via a data transfer bus to a plurality of memory units which simultaneously process the same data. The data on both data buses is compared and when a difference is detected each computer system is directed to perform the same calculation with a known result. The computer system yielding a different result is shut down and the other computer system performs another series of calculations with each unit of the shut-down computer system being connected in parallel with its corresponding unit of the operating computer system. The outputs of the two parallelly connected units are monitored for a difference. When this difference is detected the faulty unit has been localized.

The invention will be explained in greater detail with reference to the accompanying drawing in which.

The following description includes more details than ordinarily required to specifically describe the invention, but the more detailed description is, on the other hand, necessary for the explanation of the broad idea of the invention. In the description, some examples on sections of programming are given which have a certain association to the application on the invention, but it should be pointed out that the invention does not concern any program in itself but it refers to a way of localizing and thereafter disconnecting faulty, physically separated operation units in a system of two or more parallelly operating computers.

In order to explain in greater detail the idea of the invention a simplified computer is first described in general terms. The computer is built up in such a way that it can carry out the operations necessary for controlling an arbitrary system, consisting of a plurality of co-operating means, e.g. telephone network devices. A computer used in practice has a more complicated organization which has been chosen so that an optimum value should be obtained concerning the number of used means (i.e. the cost of installation) and the number of stages necessary for the carrying out of an operation. The principle function of the computer is, however, independent of said optimum value, and in order to facilitate the description it is convenient that the number of incoming and outgoing means in the computer be as small as possible.

Figure 3:
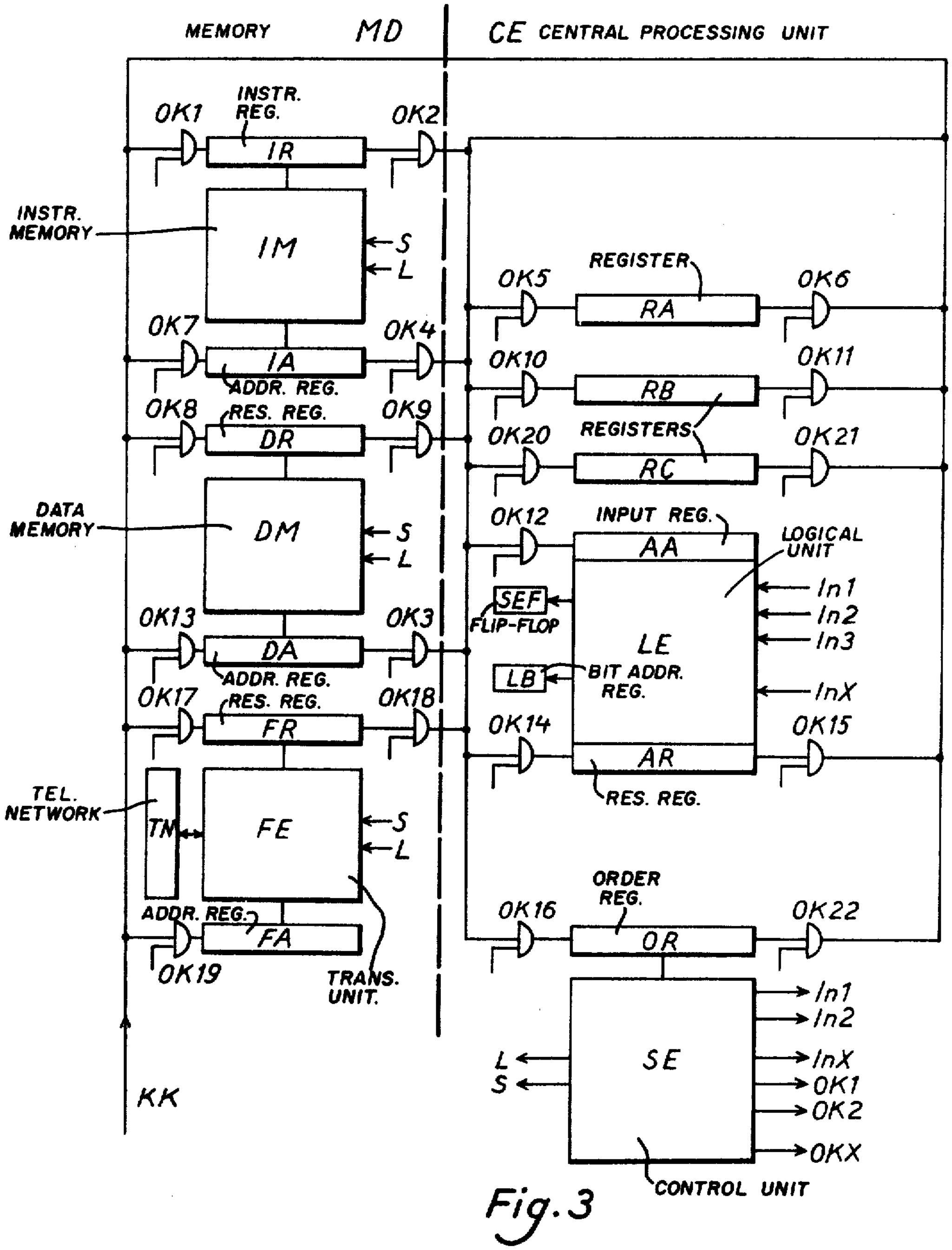
FIG. 3 is a block diagram of a simplified computer in order to elucidate the principle of the invention.

The computer can be divided into two main parts: a memory part MD including a number of memories and a central unit CE including a number of registers, an arithmetic unit and a control unit for the microprogram, see FIG. 3.

The memory part comprises an instruction memory IM (FIG. 3) in which the instructions, which shall be carried out by the computer, are stored each in its definite address in form of, e.g., 16-digit binary words. These instructions are read out either sequentially or in another sequence prescribed by the program, and every instruction implies the carrying out of a number of definite operations which are associated with this instruction and are determined by the microprogram of the computer. The microprogram can imply reading out information from and writing in information to the different means, transferring of information from one means to another, the carrying out of logical operations in the arithmetic unit, etc., in a sequence and in a number of stages determined by the particular instruction. The instruction memory IM is provided with an address register IA in which an address is written indicating where the intended instruction is stored in the instruction memory, and with an instruction register IR for holding an instruction transferred from the instruction memory IM in response to an address stored in the address register IA prior to transfer to another part of the computer. Alternatively an instruction can be supplied from another part of the computer to the instruction register IR while simultaneously an address is fed to the address register IA to indicate where the instruction shall be placed in the instruction memory IM. The last mentioned process does normally not take place during the normal operation of the computer but only upon a change in the program for during the normal function only the reading out takes place. The possibility to control writing as well as reading out is symbolized by the control signals S and L in the block diagram in FIG. 3.

In the data memory DM data words of occasional information are represented by 16-bit words. This information could, e.g., concern the momentary condition of the different means in a telephone network, the storing of digit signals, etc. The data memory DM has, in the same way as the instruction memory, an address register DA for storing the address of a memory position in the data memory DM which is to be accessed. The data memory DM has a result register DR which acts as an interface register between a memory position of memory DM addressed by register DA and the remainder of the computer when writing or reading instruction is received as indicated by S and L respectively. In the essential construction there is consequently no difference between the instruction memory IM and the data memory DM; the difference lies in the manner of their use FE indicates a further memory means, the transfer unit, whose purpose is to control means located outside of the computer itself, e.g. connecting means in an automatic telephone exchange, and to detect the condition by these means, respectively. In regard to the difference in operation speed of the computer and, e.g., the electromagnetic means which form part of a telephone exchange, a memory or buffer function is necessary, on one hand for storing the operation instructions received from the computer in form of, e.g., 16-digit binary words until the relatively slow electromagnetic means have been actuated, and on the other hand for storing the condition or state information received from the electromechanical means until the condition information can be detected by the computer. In a binary word which implies an operation instruction, "1" signifies that in a selected 16-group of means, the means associated with the respective digit position should be actuated, while "0" signifies that the means associated with the respective digit position should not be actuated. In a similar way, "1" signifies during condition sampling that in a selected group the means associated with the respective digit position is occupied, and "0" signifies that it is idle. The function of the transfer unit FE is, from the point of view of the computer, is very similar to the function of the instruction memory IM and the function of the data memory DM. In particular, the transfer unit FE has an address register FA which receives an address from the central unit CE, and can through its result register FR either cause operation of the means determined by the content of the result register FR in the 16-group of means in the telephone network TN, determined by the address register FA, or it can alternatively in the result register FR write the condition of those means in the telephone network TN which are included in the 16-group indicated by the address register FA. These two alternative possibilities are in the same way as for instruction IM memory and data memory DM symbolized by the letters L and S, respectively. A transfer unit of this type s described in greater detail in the Swedish patent application No. 8,620/65.

The central unit CE of the computer includes, according to the embodiment, three registers RA, RB and RC (FIG. 3) which can receive, store and transmit a 16-digit binary word. An essential part of unit CE is the arithmetic unit LE which can carry out different arithmetic operations, e.g. addition, subtraction, comparison, logic and exclusive or-functions. The logical unit LE receives data via input register AA. The result register AR stores one of two operands so that the result of addition or subtraction is obtained in the result register in such a way that the binary word written into the last mentioned register is changed to the calculation result. During logical comparison operations an indication is obtained from an indicator, e.g. an indicating flip-flop SEF which upon conformity indicates "0" while upon deviation indicates "1". Furthermore there is a bit address register LB which in case of an inequality upon comparison between two 16-digit binary words indicates the digit position, e.g., the lowest digit position, in which an inequality has occurred.

A third essential part of the central unit CE is the control unit SE which determines the transferring of the information between the different registers. In other words, it generates the microprogram by means of fixed connections to sequence the operations of the control unit. This unit has an order register OR which receives an order from the instruction register IR. The control unit SE decodes the binary word which has been written into the order register. The word has, e.g. 4 bits which indicate 16 possible operations, so that one of sixteen conductors is activated, compare FIG. 5. The conductor selected in this way, together with a number of conductors, which are activated sequentially, determines the feeding in and feeding out of information to and from the registers and the logic operations in the logical unit respectively, as will be hereinafter more fully described. All the registers can be connected to a common 16-wire conductor (transfer bus) which in FIG. 3 is symbolized by one single conductor via and-circuits OK1–OK22. The conduction states of the and-circuits are determined by the outputs of the control unit SE. As mentioned above the selected outputs are activated sequentially so that sequentially at least two and-circuits are opened simultaneously to make possible, on the one hand the feeding out of a 16-digit binary word to the common conductors, and on the other hand the loading of this word into that one of whose registers the input circuit is open. As indicated in FIG. 3 some of the registers have both input and output gates while other registers have only input gates from the common transfer bus since their content is not fed directly to the transfer bus. The function of the control unit SE and the whole simplified computer is easiest to understand in connection with a few elementary operations.

Figure 5:
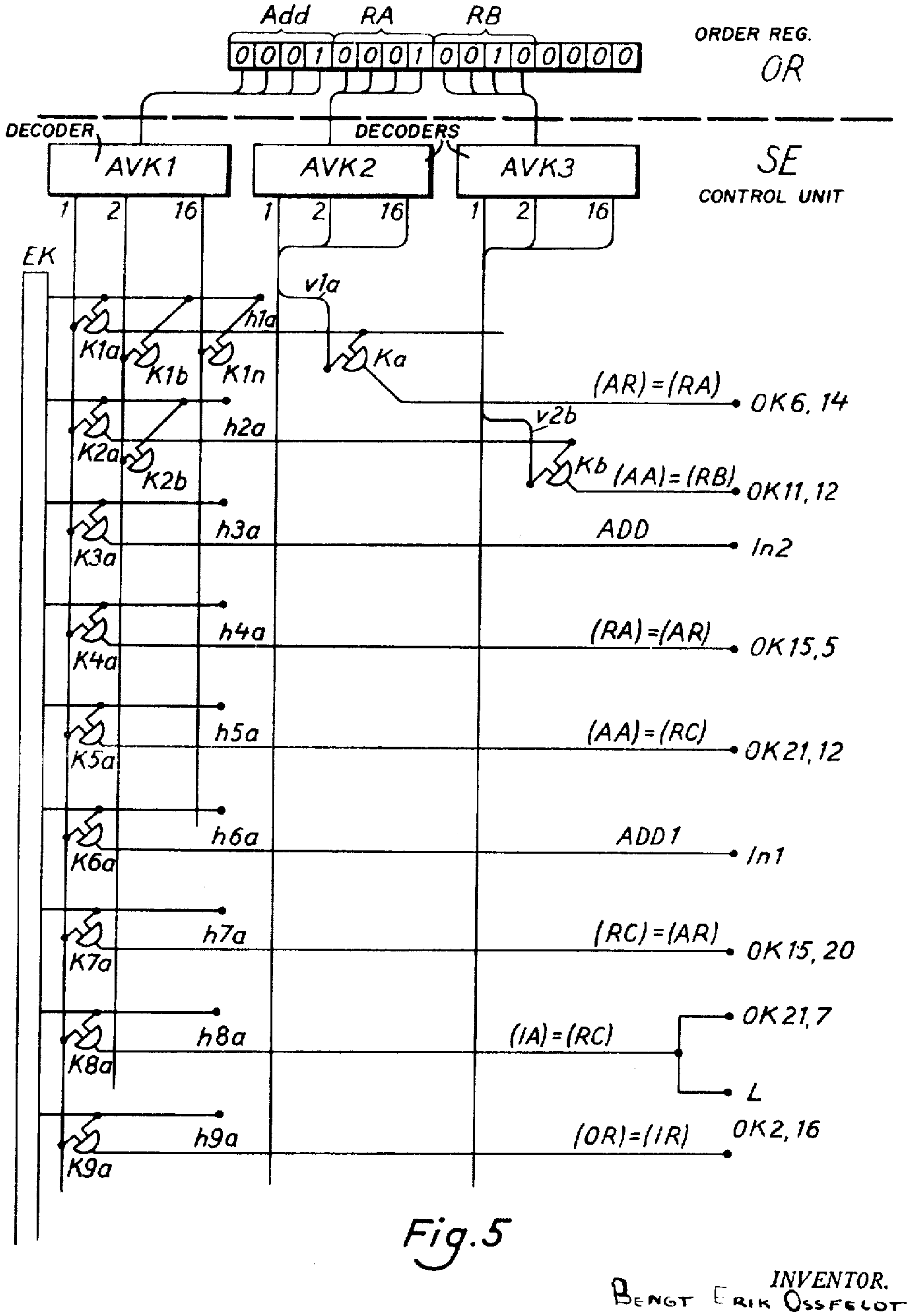
FIGS. 5 and 6 show diagrammatically the function of the control unit in the computer upon the execution of a normal program section.

Assume that two 16-digit binary words which were previously loaded into the registers RA and RB, respectively, are to be added. Furthermore, assume that the last stage of the preceding operation called for an instruction to be read out by means of an address written into the address register IA and that this instruction has been transferred instruction register from IR to the order register OR (FIG. 3). As a result of transfer of the new instruction word to the order register the previous written word is erased. Thus the new order can be formulated in the following way: add the contents of registers RA and RB. FIG. 5 shows schematically the control unit SE together with the order register OR with the mentioned order expressed in binary code. The (left) first four bits of the order indicate one of 16 possible operations, it being presumed that addition is indicated by the code 0001. The bits 5–8 from the left indicate the code 0001, the address for register RA, in which one of the operands is stored, and the bits 9–12 from the left indicate the code 0010, the address for the register RB, in which the other operand is stored. The control unit SE is supplied with decoders AVK1, 2 and 3, each of which has 4 inuts and 16 outputs. The output No. 1 of the decoder AVK1 indicates addition, the output No. 1 of the decoder AVK2 indicates that it concerns the register RA with code No. 1, and the output No. 2 of the decoder AVK3 indicates that it concerns register RB with code No. 2. Unit EK signifies a stepping forward chain with a number of outputs which are energized sequentially one after the other and which together with the output No. 1 of AVK1 sequentially energize a number of and-circuits K1*a*, K1*b* etc. These and-circuits determine, together with possible signals from decoder AVK2 and AVK3, which of the and-circuits OK1–OK22 shall be opened so that the desired transfer of binary words from one register to another can take place, and which arithmetic operations shall be executed in logical unit LE. The first stage is that the contents in register RA must be transferred to register AR in the logic unit LE, which can be written: $(AR)=(RA)$. As indicated in FIG. 5 the output *h*1*a* from the and-circuit K1*a* on the one hand, and the output *v*1*a* from decoder AVK2 (corresponding to the register RA) on the other hand form the inputs to an and-circuit K*a* which is energized and in turn energizes the and-gate OK6 and OK14. The activating of these gates is a condition for the transfer of the contents of register RA to register AR. The other registers are not affected, as can easily be seen from the block diagram of FIG. 3. Upon the receiving of the next signal from the stepping forward chain EK the conductor *h*2*a* is energized, so that the and-circuit K*b* in the cross point between the conductors *h*2*a* and *v*2*b* (corresponding to the register RB) is made conducting and opens the and-circuit OK11, OK12. For making the execution of the addition possible the contents of register RB must, namely, be transferred to register AA in the logic unit LE. It should be recalled that the two operands must be found in the registers AA and AR respectively, in order to make a calculation operation possible. Said transfer can be expressed as $(AA)=(RB)$, which is obtained by the energizing of the and-circuit OK11 and OK12, as shown in FIG. 3. The following stage will be the addition itself, and this is controlled by the third stage of the chain EK in such a way that the and-circuit K3*a*, via the conductor *h*3*a*, energizes an input I*n*2 of the arithmetic unit LE, the input of which controls the addition function.

Figure 4:
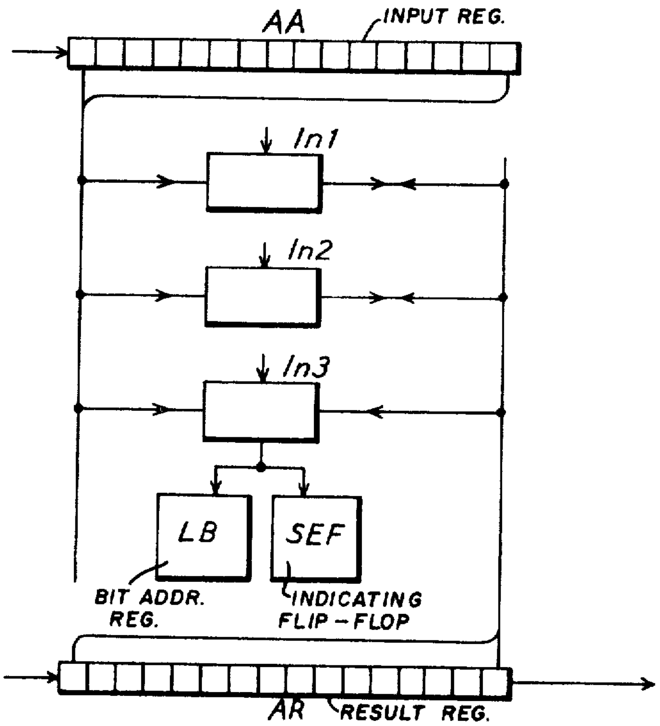
FIG. 4 shows diagrammatically a logical unit in the computer according to FIG. 3.

The arithmetic unit LE, in itself commonly known, is shown in FIG. 4 in the form of a block diagram. The two operands are fed in the form of 16-digit binary words to the registers AA and AR. In register AA every newly received word erases the already existing word stored therein. In register every newly received word is added to the already existing in the register. In register AR both input and output of the existing word in the register can be carried out while in the register AA there can only be the inputting of words. As indicated symbolically in FIG. 4 it is possible by energizing the different inputs I*n*1, I*n*2, I*n*3 etc. by signals from the control unit SE to control different operations. By energizing, e.g., the input I*n*1 the value +1 is added to the binary word written in the register AA, and the result is written in AR. By energizing the input I*n*2 the contents of registers AA and AR are added, and the result is written into register AR. If the input I*n*3 is energized, a logical comparison takes place between the contents of registers AA and AR, and if any difference in any of the binary character elements exists, "1" is indicated by an indicating flip-flop SEF, and for equality between all the character elements "0" is indicated by the flip-flop. The address of the character element, e.g., the lowest digit position in which deviation has been found, is indicated simultaneously by a bit address register LB which has 4 digit positions and consequently can indicate one of the 16 digit positions.

As mentioned above, the conductor *h*3*a* energizes the input I*n*2 of the arithmetic unit LE, so that at the third stage during the stepping forward of the chain EK the addition result is obtained in the register AR. The addition result must now be transferred to from register AR to another register for storing, e.g. to register RA, which can be exressed in the following way: $(RA)=(AR)$. To make this possible the gates OK15, OK5 are to be opened, which occurs during the next stage of the stepping forward chain by means of the conductor *h*4*a*. In the example it is supposed that the address of the instruction just performed during the carrying out of the instruction has been stored in the register RC and at the same time has been used for selecting the instruction in the instruction memory (compare the initial situation for the just described process). A registration of the address of the instruction which is just carried out is necessary to be able to determine the address from which the following instruction shall be fetched from the instruction memory. As it is well known the instructions can be read out sequentially, i.e., after a certain instruction with a certain address *n* the next instruction with the address $n+1$ is read out. As another alternative the computer can make jumps so that the address to the next instruction is determined by the calculation result which is obtained in consequence of the just executed instruction. According to the described example it is assumed that no jump is necessary but the following instruction has the next address in the sequence. Consequently the next stage indicates that the instruction address is fetched from the register RC and is increased by 1 in the arithmetic unit LE. The fetching itself from register RC and the transfer to register AA can be symbolized as $(AA)=(RC)$ and takes place in such a way that the signal on the wire *h*5*a* in the control unit SE opens the gates OK21, OK12. By energizing the input I*n*1 as described in connection with FIG. 4, which is obtained by energizing the wire *h*6*a*, 1 is added to the binary word written in register AA and the result which forms the new instruction address is obtained in register AR. The new instruction address must now on the one hand be stored until the instruction has been executed to form the base for determination of the next instruction address, and on the other hand be written in into the address register IA of the instruction memory IM to seek the next instruction. The storing of the instruction address takes place again in register RC, which can be expressed $(RC)=(AR)$, the wire *h*7*a* energizing the gates OK15, OK20. The transfer of the instruction address from register RC to the address register IA, which can be expressed $(IA)=(RC)$ takes place when the wire *h*8*a* energizes the gates OK21, OK7. At the same time the reading out instruction is sent to the instruction memory IM by energizing the input L, so that the instruction is read out and transferred to the result register IR of the instruction memory. The next stage is the transfer of this instruction to the order register OR: $(OR)=(IR)$ by energizing the gate OK2, OK16 by means of the conductor *h*9*a*. The formerly written instruction is thus erased, the stepping forward chain EK is restored to its initial position and a new process begins which in dependence on the written-in instruction naturally can be of quite a different type, i.e., prescribe a subtraction instead of the just executed addition.

Figure 6:
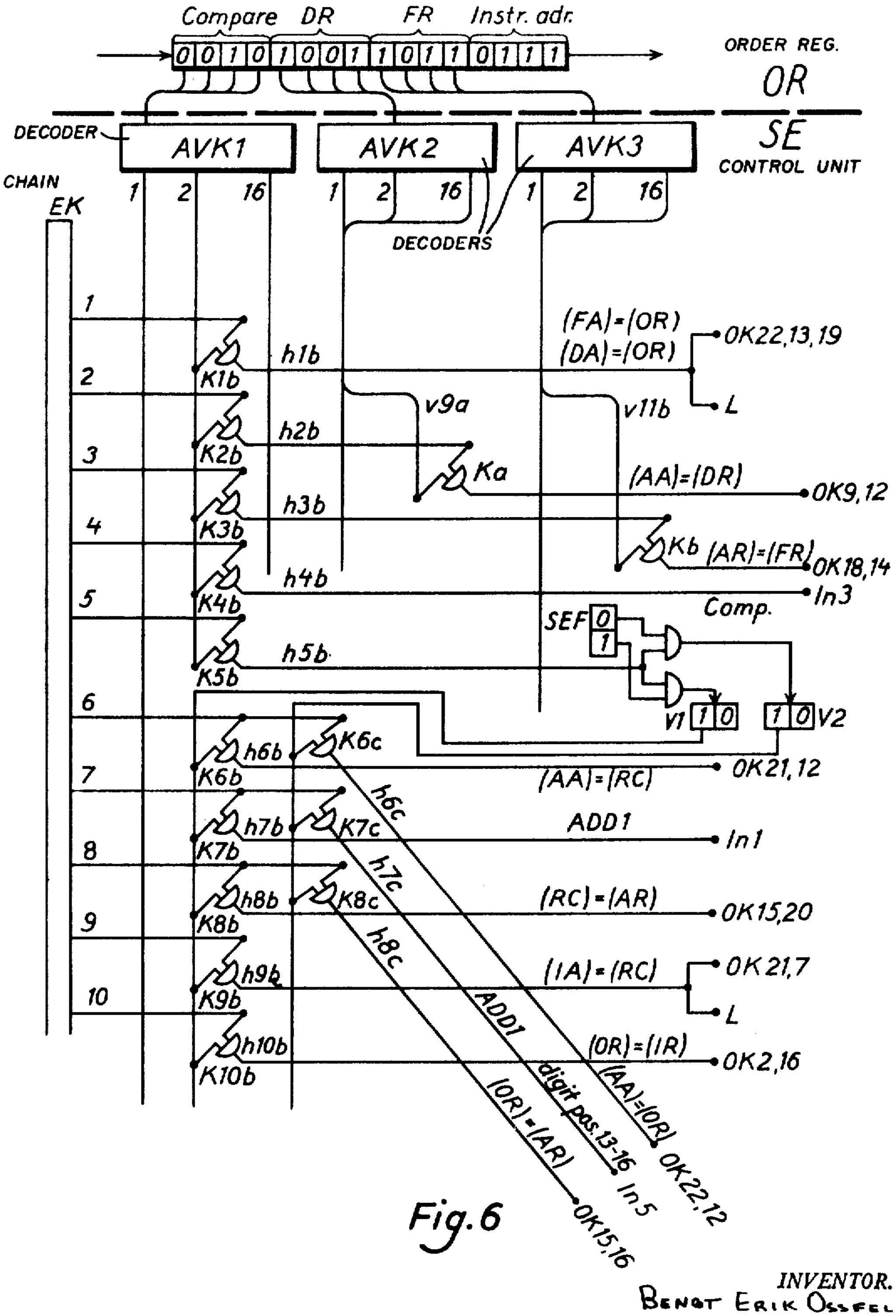

With reference to the above description an example will be given to show how the computer solves a problem in connection with the control of an automatic telephone exchange. One of the many problems which occurs is to examine whether any change in the state in a definite subscriber's line has occurred, i.e., that a subscriber, which at the last detection of the state was idle, now is occupied, or now is idle after previously having been occupied. As described above in connection with the transfer unit FE the detection of the state of the subscriber's lines takes place in groups of 16 subscribers, so that a 16-digit binary word is obtained. Each bit position of the word has a binary digit "0" or "1" associated with each of the 16 subscribers in the group depending on their idle and occupied states, respectively. Selection of a 16-group takes place by means of an address written in into the address register FA of the transfer unit FE. The detection of the state of subscriber's lines is cyclical with intervals of e.g., 300 ms. and the result is recorded in the data memory DM under the address associated with the respective 16-group so that always the last record is stored in the data memory. In order to ascertain whether any change in the state of the lines has occurred, a comparison is made between the result obtained in the transfer unit by means of a definite address and the record found under the same address in the data memory DM which can be expressed as follows: compare the content in register FR with the content in register DR. For the sake of simplicity it is assumed that the now described operation directly follows the above described addition operation, i.e. the instruction, which during the last stage has been transferred to the order register OR prescribes comparison between the contents of positions in memories FE and DM whose address is indicated by the instruction word. FIG. 6 shows the order register OR and the control unit SE in a similar way as shown in FIG. 5. The order register is indicated by the registered instruction word in which the bits or character elements 1–4 from the left indicate one of 16 possible operations, according to the example a comparison operation with code number 2, the digit positions 5–8 indicate the place where one of the operands is located, according to the example the register DR with code number 9, the digit positions 9–12 indicate the place where the other operand is located, according to the example register FR with code number 11, and the digit positions 13–16 indicate the address of the 16-group of subscribers which is to be examined and which according to the example has been assumed to have the address 7. The instruction word thus has the form 0010 1001 1011 0111.

Similarly to the description in the preceding example, the stepping forward of the chain EK opens the different gates sequentially but with the difference that in this case it is the out put No. 2 of the decoder AVK1 which actuates the different and-circuits K1*b*, K2*b* etc. sequentially in step with the stepping forward of the chain. The first stage is that the instruction word is transferred from the order register OR to address registers DA and FA. This takes place in order to permit the character elements 13–16 from the left to be used an address for the subscriber's group which is to be examined. The gates OK22, OK13, OK19 are opened and simultaneously reading out takes place in memory FE as well as in memory DM so that the condition recording concerning the intended subscriber's group with the address 7 (0111) is written into register FR as well as into register DR. This is carried out by activating the conductor *h*1*b* (see FIG. 6). During the next stage the contents of register DR shall be transferred to register AA by opening the gates OK9, OK12. This takes place by means of an and-circuit K*a*. And-circuit K*a* is activated by a signal on the conductor *h*2*b* of the forwarding chain EK as well as a signal on the conductor *v*9*a* of the decoder AVK2 (according to the code number 9 for register DR). Then the contents of register FR is transferred to register AR by opening the gates OK18, OK14 under control of and-circuit K*b* which is activated by the simultaneous occurrance of signals on the conductor *h*3*b* and the conductor *v*11*b* of the decoder AVK3 (according to the code number 11 for register FR). The next stage is a comparison between the contents register AA and of register AR which is obtained by activating the input I*n*3 of LE logical. If a difference has been found in any of the digit positions this is indicated by the indicating flip-flop SEF showing the "1"-position. If there is no difference the indicating flip-flop is in the "0"-position. At the next stage, when the wire *h*5*b* is activated, there are two alternatives. The next instruction can be fetched from two different places: If a difference has been found, i.e. the comparison result from SEF flip-flop is "1" the address of the next instruction will be the next one of the numerical sequence. The address of the just executed instruction is in the register RC and this address shall be increased by 1. The gates OK21, OK12 are opened to transfer the contents of register RC to register AA which is obtained by activating the conductor *h*6*b*. Then the conductor *h*7*b* is activated to activate the input I*n*1 of the logical unit LE and add 1 to the contents of register AA. The result is stored in register AR. From register AR the new address is transferred to register RC for storage by activating the conductor *h*8*b* and opening the gates OK15, OK20. From register RC the new instruction address is transferred to register IA by opening the gates OK21 and OK7, and reading out takes place so that the instruction with the indicated address is transferred to register IR. Then the instruction is transferred to register OR by opening the gates OK2, OK16. This new instruction is a consequence of the fact that a difference has been found at the comparison and can, e.g., imply that a connecting process to the respective subscriber's equipment shall start. If, on the other hand, no difference has been found at the comparison and flip-flop SEF indicates "0" another instruction shall be carried out implying, e.g., that the sequentially following 16-group of subscribers shall be tested.

The address of the subscriber's group which has been tested was recorded in the digit positions 13–16 from the left. This address shall now be increased by 1. As a consequence of the fact that flip-flop SEF indicates "0", a current path is activated which activates the and-circuits K6*c*, K7*c*, etc., in the same way as described in connection with the first alternative in connection with the outputs of the stepping forward chain, so that signals are obtained sequentially on the outputs *h*6*c*, *h*7*c*, etc. To be able to calculate the new address the contents of the order register OR shall first be transferred to register AA, in consequence of which the activating of the wire *h*6*c* opens the gates OK22, OK12. As the next stage 1 is added in logical unit LE to the address part in register AA, i.e. the digit positions 13–16 which is obtained by activating of a particular input I*n*5 of the logical unit. As it is the same instruction which continues with the only difference being that the address in the instruction word has been increased by 1, the instruction memory IM is not needed but the contents of the result register AR can directly be transferred to the order register OR which is accomplished by opening the gates OK15, OK16 by means of the conductor *h*8*c*. In this way the same condition has occurred as when the preceding instruction was started, the stepping forward chain is set to zero and its outputs activate again sequentially the conductors *h*1*b*, *h*2*b*, etc., until equality or difference, respectively, is found between the instantaneous condition and the formerly recorded condition of the indicated subscriber's group.

When the control of the telephone plant is carried out by means of a computer the condition of each of the means forming an integral part of the plant is regularly sampled with a certain periodicity, and the sampling periods are so short that every change in condition is detected with certainty, i.e. that no change is lost. In regard to, e.g., impulse receiving relays the contacts of which accurately follow the changes in the incoming signals a detecting period must be relatively short, e.g. 10 ms. On the other hand there are such means which do not need to be detected or operated so rapidly. At the connection of exchanges, e.g., a function period of 100 ms. can be sufficient and at, e.g., scanning of the subscriber's lines to detect the condition a period of 300 ms. is sufficient. These values are taken into consideration when programming computers which operate in, e.g., 3 different priority levels which implies that functions with a short scanning time, i.e. higher priorities are carried out first, while functions with lower priority must wait until all the functions which have higher priority levels have been carried out.

Figure 9:
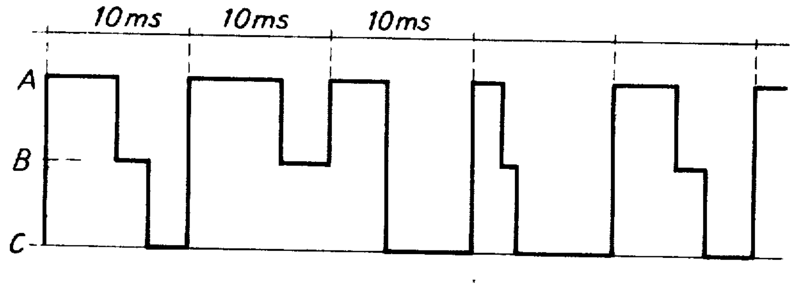
FIG. 9 shows diagrammatically a timing diagram for the function of the computer on different levels of priority.

FIG. 9 shows diagrammatically a time lapse for the 3 levels in an arbitrarily chosen example. As can be seen, the time axis is divided into 10 ms. intervals. The highest priority level A in which, e.g. test and control means of means for the receiving and control of signals take place, starts unconditionally every tenth ms. This implies that if the function associated with the level A is not completed during a 10 ms. period the working is continued during the next 10 ms. period or periods, while the functions with priority level B or C must wait. Every time the function on the level A has been completed before the end of the 10 ms. period, the priority level B is started which belongs to less important functions than those on the level A, e.g. connection and disconnection of switches or switching in and switching off of less important relays. In the same way the priority level C must wait until the function on level B has been completed. The moments in which the levels B and C are started are determined on the one hand by the program and on the other hand by the traffic in the telephone exchange, which can cause a displacement of this moment.

Figure 10:
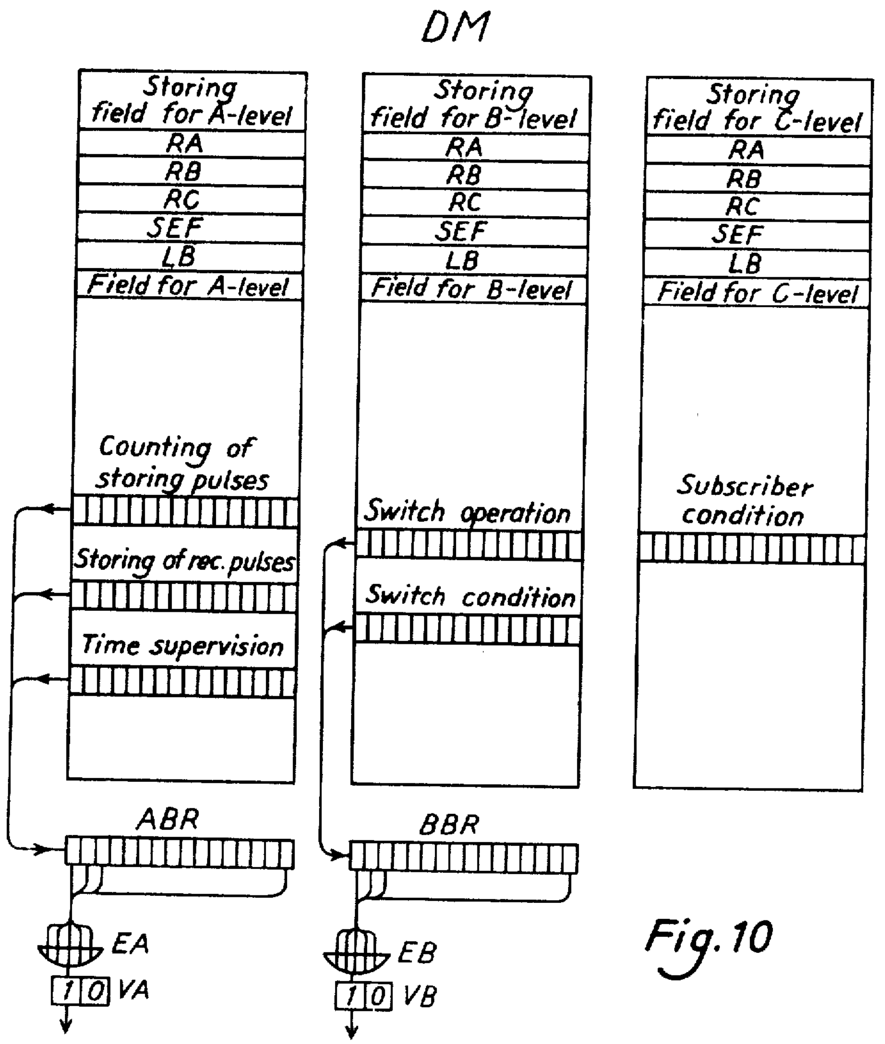
FIG. 10 shows diagrammatically a data memory field with a number of subfields.

It appears from the above mentioned description that the function on the levels B and C must be interrupted when the function starts every tenth ms. on the level A. To avoid the loss of information concerning the function which is going on at just that moment when the level B or C is interrupted, the information at the moment of interruption must be stored in subfields reserved for this purpose in the data memory DM (diagrammatically shown in FIG. 10) so that it can be used again when the computer again can work on the respective level. The storing implies that all the registers in the central unit CE must be emptied and their contents must be stored in such a way that it can be restored immediately into the right position in the central unit CE. Thus, it is the contents of the registers RA, RB, RC, SEF and LB, which shall be stored in the subfield for, e.g., level B if it was this level which was interrupted. The transfer takes place in the same way as described in connection with the above mentioned operations by opening an input gate or an output gate respectively of those means between which transfer of information shall be carried out sequentially. This occurs in the same way as a normal operation by means of the control unit SE and will be described in greater detail later on in connection with a fault test upon which even the level A has to be stored but the process is the same as upon the storing of level B or C.

On level A, functions are carried out which have the highest priority, e.g. receiving and sending of signals as already described. These functions consist of a number of subfunctions each of which is stored in a subfield. There are, e.g., subfields for the counting of received impulses, for time control during sending concerning the length of pulses and pauses, corresponding functions at receiving, etc., as shown diagrammatically in FIG. 10. All these subfields belong to the level A, and as long as they include information this implies that there is more work to be carried out on the level A. This is indicated by setting to "1" a definite digit position, a so-called work bit, in every one of these subfields. In a similar way definite subfields belong to the level B, e.g. information concerning the condition of switches, connection of switches, etc., and to the level C, e.g. information concerning the condition of the subscriber's lines. As symbolized in FIG. 10 indicators VA and VB respectively are set to one as long as the work bit in any of the subfields for level A and B respectively is "1". This is symbolized in FIG. 10 by OR-circuits EA and EB but in practice it can be done in such a way that the computer reads out the work bits sequentially in every subfield. For level C no similar indicating is necessary as the computer enters the level C only when there is no work on level A or B.

The computer tests first the indicating flip-flop VA of level A and as soon as this is set to zero, i.e. when the work has been completed on level A or when no sending or receiving of signals is going on (during low traffic) it starts its work on level B. When the work on this level has been concluded, or during low traffic when no connection shall be set up or disconnected, the indicator for level B is set to zero and a jump occurs to level C. On this level work is going on continuously even during low traffic when, e.g., scanning of the condition of the lines shall go on continuously even if during low traffic no work is carried out on level A or B.

As already mentioned the function on level A is started every 10 ms. and for this purpose the computer must test the indicator VA every tenth ms. If the indicator shows that there are records in the subfields associated with the level A the work on this level must go on until all the tasks have been worked out. If this work should not be concluded within 10 ms., this implies that the load of the computer is too high. In the same way all work on level B is carried out before a jump takes place to level C. As already mentioned the tasks concerning levels B and C, respectively, must be stored in subfields reserved in the data memory for this purpose, if there has not been time enough before the next 10 ms. period as started as a jump to the level A is absolutely necessary.

Figure 11:
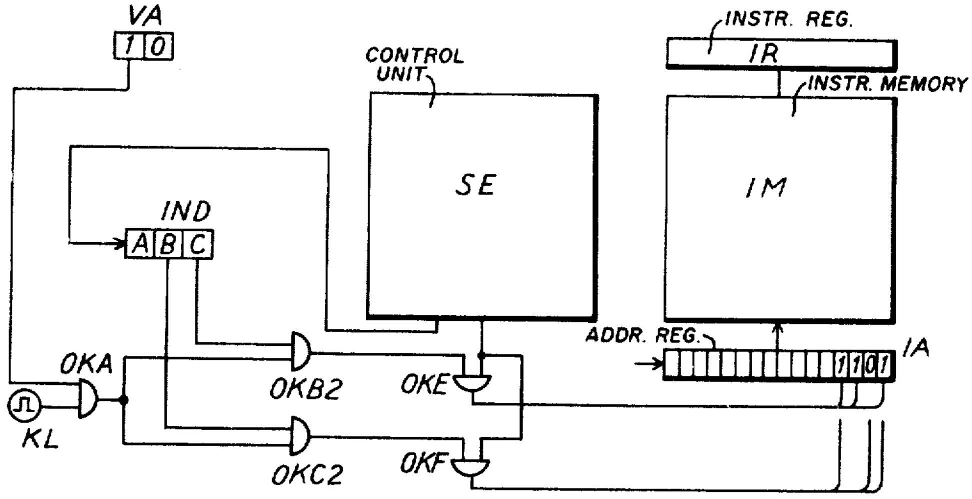
FIG. 11 shows the transition from a lower to a higher priority level under the normal function of the computer.

This process is diagrammatically indicated in FIG. 11. KL symbolizes a clock which produces clock pulses with 10 ms. intervals, and OKA symbolizes an AND-circuit the one input of which is formed by the mentioned clock pulses and the other input of which is obtained from the "1"-position of the indactor VA. The output appears from this circuit if the indicator VA is set to one and this output is fed to two AND-circuits OKB and OKC the other output of which is obtained from an indicating chain IND. This has three stages A, B and C which are activated corresponding to the three priority levels. The chain is forwarded to the next stage by the same pulse which causes the starting of a new priority level (FIG. 9) in such a way that that stage in the chain is always activated which corresponds to the priority level which is just going on. Since the outputs from stage B and C, respectively, form the other inputs to the AND-circuits OKB and OKC, an output is obtained at the appearance of the clock pulse KL only from that one of the two AND-circuits OKB and OKC on the priority level of which the computer is just working. This output signal will cause the storing instruction for the information found in the central unit CE. Before the storing is started one more condition must be complied with, namely that the instruction which is being carried out terminates. This is necessary in order to have all information available at the recommencing of the program section. When the stepping forward chain EK (FIG. 6 to 7) has carried out the last stage and is reset to zero a signal is obtained on an output of the control unit SE an indication that the instruction written in the order register OR has been carried out. This signal activates together with the signal obtained from the circuits OKB and OKC one of the AND-circuits OKE and OKF, respectively, the output of which selects a definite instruction address in the address register IA of the instruction memory IM. In this way the existing instruction is read out on the mentioned address found in the intruction memory IM and is written into the result register IR of the instruction memory. This instruction word includes the instructions which are necessary to control the AND-circuits OK1–OK22 in such a way that all the information concerning the section on level B and C respectively being worked on its transferred to the field reserved in the data memory for this purpose. This takes place so that the instruction word is written into the order register OR and the control unit is stepped forward by means of the forwarding chain EK to open the gates sequentially as described in connection with the FIGS. 5 and 6. Such a process of storing will be described in greater detail in connection with the storing of information associated to level A in fault localization.

When the information concerning the B or C level program just going on has been transferred to the data memory, the next instruction address is selected in the address register IA of the instruction memory. This address determines the next instruction which shall be transferred to the order register OR which instruction implies that the information which has been gathered during the last 10 ms. in the fields associated with level A shall be transferred to the central unit and be processed in the manner determined by the program. When all the information in the subfields of level A has been treated and these fields have been emptied, the indicator of level A is set to 0 and a definite address in the address register of the instruction memory is selected. This address indicates an instruction for a retransfer to the central unit of information stored in the subfields of level B. If the indicating bit for level B is 0, i.e. when the level A was started, no function was interrupted on level B and consequently no information needed to be stored on level B, an instruction address is selected for a new instruction word. This implies a transfer of the information which is stored in the subfields on level C in the data memory DM to the central unit CE and the carrying out of the processes determined by the program for level C. The following clock signal after the end of the 10 ms. period interrupts the work on level C and causes storing of the information associated with level C and found in the central unit CE in the subfields intended for this purpose in the data memory DM.

Figure 1:
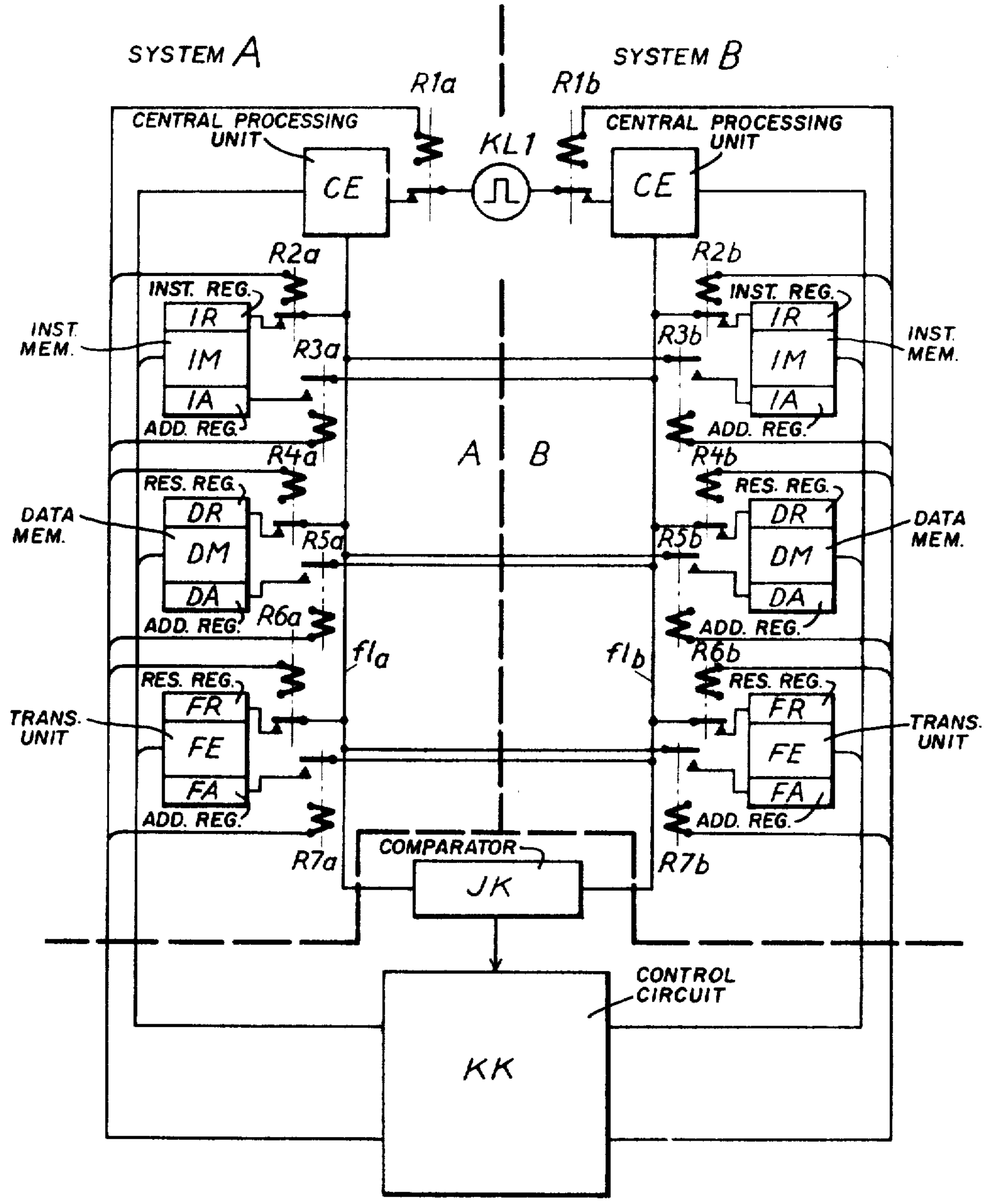
FIG. 1 shows diagrammatically a system consisting of two parallelly and synchronously operating computers, on which system the principle of the invention can be applied.

FIG. 1 shows a block diagram of a system consisting of two computers A and B which are built up of function units identical in the two computers, which function units are a central unit CE, an instruction memory IM, a data memory DM and a transfer unit FE. The computers A and B work synchronously together and solve the same problem to make a control possible by comparison between their result. For this purpose a comparison circuit JK is arranged which permanently compares the process going on in the two computers and which at the slightest deviation gives a signal to a control circuit KK. As it appears from the earlier description of a computer the central unit CE and the memories IM, DM and FE are interconnected via a 16-wire interconnecting line or transfer bus *f1a* and *f1b*, respectively. These 16-wire lines of the computers are connected to the comparison circuit JK which gives an indication as soon as a deviation occurs in the two 16-digit binary words which are fed through the connecting lines of the two computers. One of the tasks of the control circuit KK is to detect such signals from the function units, which occur in consequence of certain well definable faults, e.g. owing to short circuit alarm, parity control signal. There are however faults which cause no definite fault signal, and the task of the control circuit KK is to start a fault localizing program at the slightest difference between the processing of the two computers, which is indicated by a signal from the comparison circuit JK. Owing to the fact that the computer is divided into said function units each of which has its definite function and do not differ much in size the fault localizing is facilitated.

As indicated in the block diagram on FIG. 1 anyone of the function units in the two computers can be disconnected and connected to the other computer. This is symbolized by the relays R1*a*, R1*b*, R2*a*, R2*b*, etc., but in practice it is suitably obtained by means of electronic means which are controlled by the control circuit KK.

According to the fundamental idea of the invention the control circuit KK shall, upon the receipt of a signal from JK during, e.g., a time of maximum 10 ms., temporarily halt the normal program of both computers and direct the two computers to carry out the same definite calculating operation. That one of whose calculation computers the result does not coincide with the test result determined beforehand is faulty and it is immediately disconnected by the control circuit, while the faultless computer continues its normal function. This will be illustrated later on by means of an example. The determination of the faulty computer occurs with the highest priority which is still higher than the priority level A. This implies that even if the computers should work on level A at the detection of a fault the function must be interrupted and the information found in the central unit must be stored in a subfield in the data memory, particularly intended for this purpose. The only delay which arises is that the microprogram shall be concluded according to the instruction word recorded in the order register in order to have the address to the next instruction at disposal upon return to normal operation. This has been explained in connection with the storing of information found on levels B and C, when the computer enters into level A every 10 ms. Said delay is of a considerably lower magnitude, e.g. $10^{-7}$ seconds, and negligible in comparison with the A-period ($10^{-2}$ s.).

When it has been settled which one of the computers was the faulty one and this computer has been disconnected, the stored information is retransferred to the central unit and the function on level A continues. If the computers have worked on level B or C upon the detection of a fault the storing takes place in the same way as described in connection with the transition to level A. After the disconnection of the faulty computer the fault localization starts in the same. This, however, does not take place with the highest priority since the localizing of the fault is not so urgent that it requires an interference in the normal program. Consequently neither level A or level B may be interrupted to start the fault localization but the fault localization takes place on level C. The control circuit KK connects the different function units of the faulty computer sequentially and individually to the faultless computer and causes every such function unit to carry out a test calculation with the corresponding function unit of the faultless computer. It appears from FIG. 1 that if, e.g., the computer B has been found faulty it can be disconnected by activating the relay R1*b*. Supposing that during the fault localization e.g., the instruction memory IM of computer B shal first be tested, the relay R3*b* is activated. Consequently, the instruction memory IM with its associated address register IA is connected to the conductor *f1a* of the computer A, and furthermore, the relays R4*b* and R6*b* are activated to disconnect registers DR and FR from the conductor *f1b* of the computer B. Consequently only register IA can in this case obtain address information from the computer A and only register IR can feed an information selected by said address to the 16-wire conductor which leads to the comparison circuit comparator JK. An inequality signal is obtained from JK when the signals from the instruction memory IM of computer A and computer B respectively differ from each other which implies that in the faulty computer, instruction memory IM was the faulty unit. If no inequality signal is obtained this implies that instruction memory IM has been faultless, and at the next stage data memory DM of the faulty computer is connected to the faultless one in the same way as what occurred in connection with instruction memory IM. If data memory DM is not faulty than transfer unit of the faulty computer is connected in the same way, and if still no inequality signal has been obtained the central unit CE of the computer B must be faulty. If it has been found that one of the function units IM, DM or FE has been faulty this unit is disconnected in the continuation of the process and the computer B is put into operation again but with the difference in relation to the initial conditions. Instead of using the disconnected faulty function unit, e.g. memory IM, the computer B uses the instruction memory IM of computer A in common with the last mentioned computer. In this way it is possible to carry out a continuous control by a permanent comparison between the calculating result of the two computers, the control naturally not including the part used in common. An example of fault localization in the above described way will be described later on.

Figure 2:
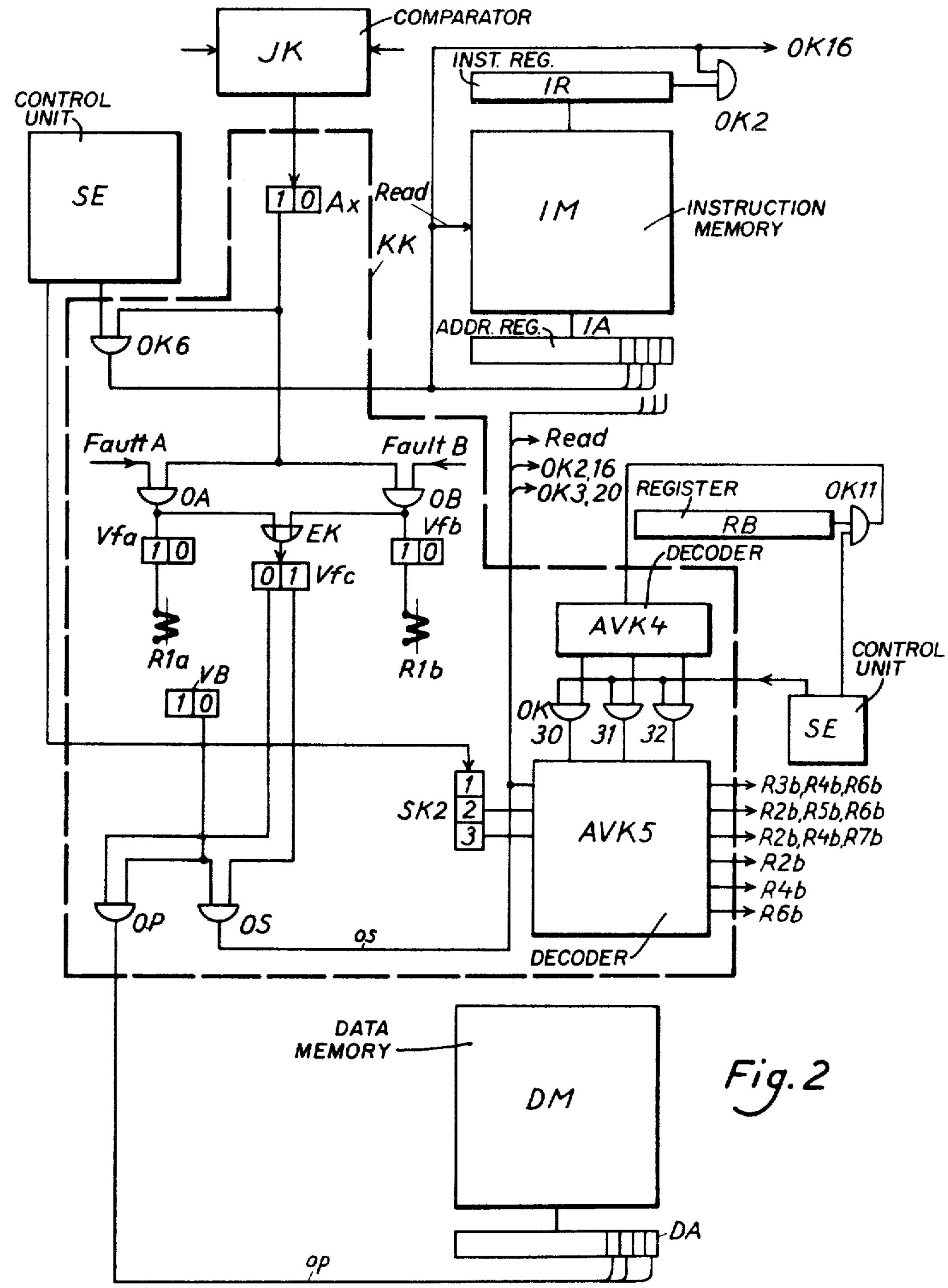
FIG. 2 shows the control circuit according to FIG. 1 in greater detail in the form of a logical diagram.

FIG. 2 shows diagrammatically the control circuit KK. A*x* indicates a binary flip-flop which, upon an inequality between the results of the two computers, obtains a fault signal from comparator JK and is changed to the "1"-condition. A signal is obtained from flip-flop A*x* which directly selects an instruction address for reading out of memory instructions by means of which the information stored in the registers RA, RB, RC, flip-flop SEF and logic with LE of the central unit is transferred to a storing field in memory DM in the same way as it has been described in connection with the storing of the levels B and C. When faults have been signalled, even the level A must be interrupted and the information must be stored during the fault localization. The microprogram just going on must naturally be concluded before the storing takes place, so that the address of the next instruction shall be available when the normal program restarts. This is symbolized by an and-circuit OK6 which receives one input signal from the flip-flop *Ax* and another input signal from the control unit SE when this is set to zero after the concluding of in instruction. The signal from the and-circuit OK6 causes a selection of a definite address in the address register IA, the reading out of the information on the respective address found in the instruction memory IM so that this information is transferred to register IR and, finally, the opening of the and-circuits OK2, OK16, so that the instruction word from register IR is transferred to the order register OR.

Figure 7:
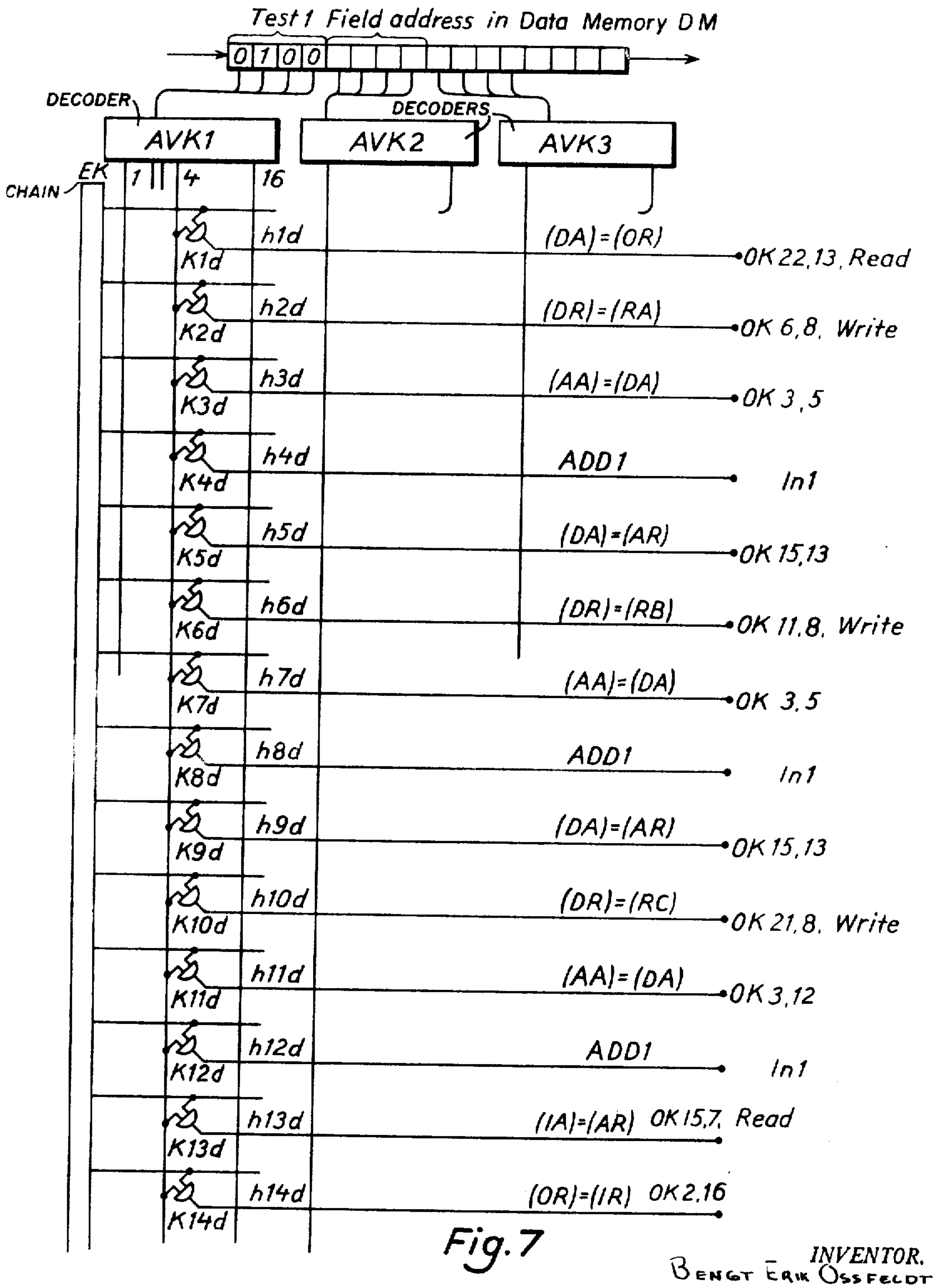
FIGS. 7 and 8 show diagrammatically the function of the control unit in the computer upon the carrying out of a test program.

This condition is symbolized in FIG. 7 which shows the control unit SE when it carries out the microprogram determined by the instruction word. The output No. 4 of the decoder AVK1 is now activated and by stepping forward the chain EK the conductors *h*1*d*, *h*2*d*, etc., are activated sequentially. During the first stage the and-circuits OK22, OK13 are opened and the instruction word which includes the address of a storing field is recorded in register DA. At this address the first information shall be stored which is transferred from the central unit and this information becomes the contents of the register RA. For this purpose the an-circuits OK6, OK8 must be opened during the next stage in the microprogram and simultaneously a writing instruction must be sent to the data memory DM in consequence of which the word recorded in register DR is written into the address indicated in register DA. To make the next storing possible the address must be determined and this is obtained by increasing the preceding storing address by 1. The address which is found in register DA is transferred to register AA by opening the and-circuits OK3, OK5 during the next stage. The address is register AA is now increased by 1 by activating the input I*n*1 of logic circuit LE and the increased address appears in register AR. This address is transferred to register DA by opening the and-circuits OK15, OK13. The next stage is the storing of the contents of the register RB which is transferred to register DR by opening the and-circuits OK11 and OK8 and by sending simultaneously the writing instruction so that the contents of register RB is stored under the indicated address. During the next stage the contents of register DA is transferred to register AA by opening the gates OK3 and OK5, the contents of register AA is increased by 1 by activating the input I*n*1 and the result obtained in register AR is transferred to register DA by opening the and-circuits OK15 and OK13. During the next stage the contents of the register RC is transferred to register DR by opening the and-circuits OK21 and OK8 and he writing instruction is sent to memory DM so that the contents of register RC is stored in the indicated address. During the next stage the contents of register DA is transferred to register AA by opening the and-circuits OK3 and OK12 and is increased by 1 by activating the input I*n*1 and the result is obtained in register AR. The next stage consists in the opening of the gates OK15 and OK7 and the transfer of the contents of register AR to register IA where it is used as an address for the reading out of a new instruction. This new instruction is then transferred from register IR to the order register OR by opening the gates OK2 and OK16. This was the last stage of the microprogram by which the storing of the contents of the registers RA, RB and RC and of the logical unit LE has been concluded. The new instruction fed to the order register OR implies the start of the test program itself which, according to the example, is a control in which a simple addition is carried out correctly and which program is stored at a definite place in the data memory DM. Tasks associated with this test shall now be transferred to the logic unit LE. This microprogram is diagrammatically symbolized in FIG. 8 which, in the same way as FIG. 7, shows the new instruction word written in the order register. This instruction word implies that the output No. 5 of the decoder AVK1 is now activated. During the first stage the conductor *h*1*e* is activated which opens the gates OK22 and OK13, and the contents of the register OR is transferred to register DA using the digit positions 5–8 as a field address in memory DM. The contents of this address shall be read out and be transferred from register DR to register LE, more exactly to register RA. For this purpose a reading instruction is first sent and during the next stage of the stepping forward chain EK the gates OK9 and OK5 are opened, and the contents of register DR is transferred to register RA. Then the address in register DA which has indicated the subfield is transferred to register AA by opening the gates OK3 and OK12 during the third stage of the chain. The address shall be increased by one by actuating the input I*n*1 of unit LE and the result is obtained in register AR. This is the new address which shall be transferred to register DA by opening the gates OK15 and OK13 and a reading instruction is sent to memory DM so that the information is transferred to register DR. This information is now transferred to register RA by opening the gates OK9, OK5. The contents of register RA is now transferred to register AA by opening the gates OK6 and KO12 and the contents of register RB is transferred to register AR by opening the gates OK11 and OK14 after which addition takes place by activating the input I*n*2 of the logical unit LE. The result in register AR is stored in register RA by opening the gates OK15 and OK5. The address to the next task in memory DM must now be determined by transferring the contents of register DA which has determined the address to the last obtained information to register AA to be increased by 1. First the gates OK3 and OK12 are opened after which the input I*n*1 is activated to add 1 to the contents of register AA. The result from register AR is transferred to register DA by activating the gates OK15 and OK13 after which the contents on the address given in memory DM is read out and is stored in register DR. Said address has included the final result with which the formerly obtained addition result shall be compared. The contents of register DR is first transferred to register RB by opening the and-circuits OK9 and OK10. Now the addition result is stored in register RA and the control result in RB. During the next stage the addition result is transferred from register RA to register AA by opening the gates OK6 and OK12 and the control result is transferred from register RB to register RA by opening the gates OK11 and OK14. Then a comparison takes place in logical unit LE by activating the input I*n*3.

Figure 8:
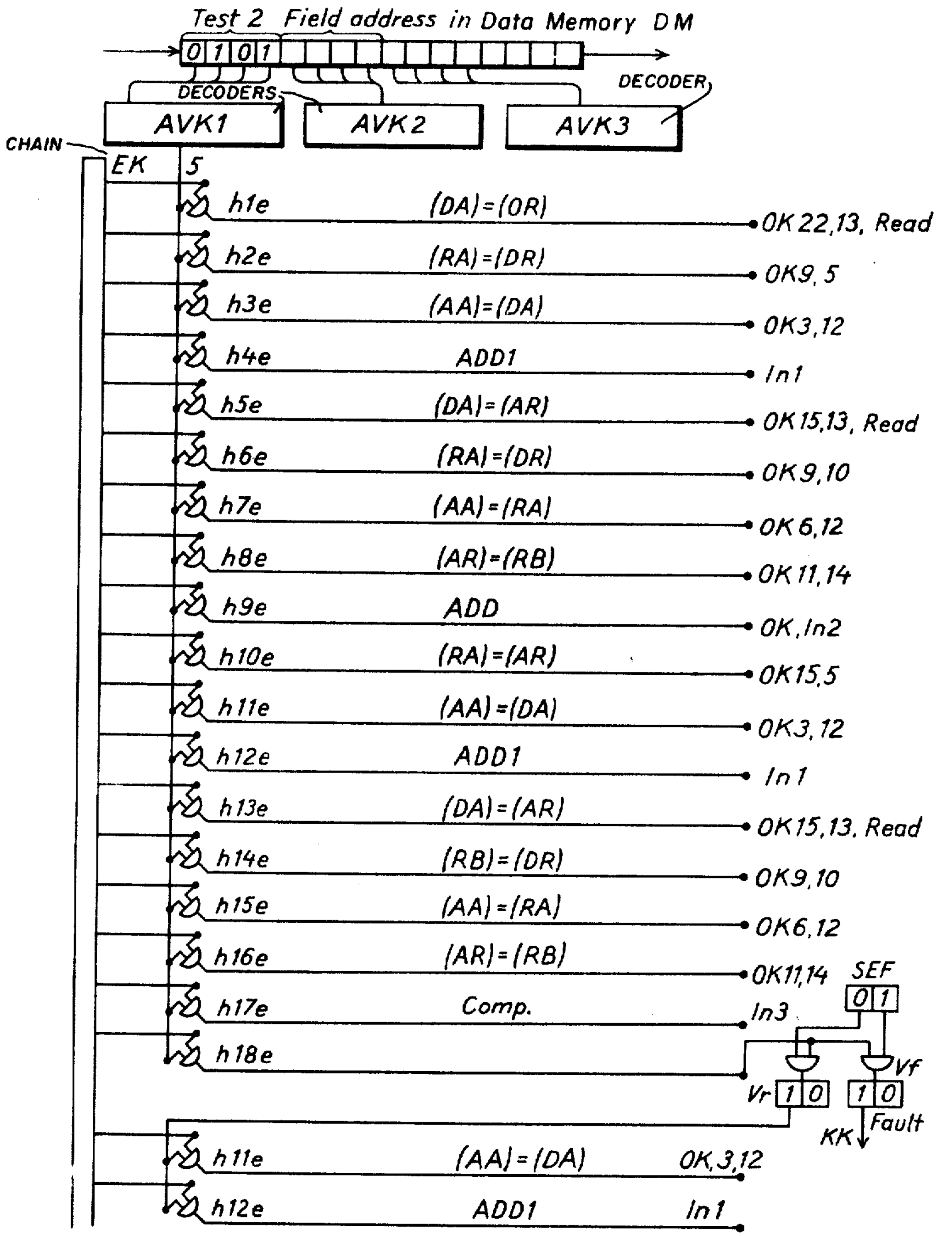

There are two possibilities. If the comparison has given the result 0, the zero input of the indicating flip-flop SEF is activated, which implies that the program continues in such a way that a jump takes place back to the conductor *h*11*e* where chain EK starts the stepping forward again, i.e. the address to the next subfield is determined in the same way as occurred previously. The address in register DA is transferred to register AA by opening the gates OK3 and OK12. This address is increased by 1 by activating the input I*n*1 so that the address to the next testing task is obtained. If it appears after the concluding of the whole test program that both computers have solved all the problems correctly, both computers are reconnected since the inequality between the results of the computers must have been the consequence of a transient fault. If, contrarily, the comparison has shown that an inequality between the calculated result and the control result exists a flip-flop V*f* is set to 1 and a fault is indicated to the control circuit KK (FIGS. 8 and 2). This includes and-circuits OA and OB, respectively, for the two computers. One input of the and-circuits consists of the fault signal from the respective computer and the other input of the and-circuits consists of the fault signal from the flip-flop A*x* which was activated when the comparison circuit JK indicated inequality between the two computers. If it has apeared that, e.g., the result calculated by computer B did not correspond with the control result, the flip-flop V*fb* is set to the 1-condition and the relay R1*b* is operated which, as seen from FIGS. 1, implies the disconnection of the computer B. Thereafter only the computer A is working. Simultaneously with the disconnection of computer B the flip-flop V*fc* has been set to 1 which signifies that a waiting condition exists so that it shall be possible to start the fault localizaiton at a convenient moment, i.e. determine which functional unit of the faulty computer is the faulty one. As earlier mentioned in connection with FIG. 10 there is a flip-flop for the fields for each one of the levels A and B, VA and VB respectively which are set to 1 as long as there is work for the respective level. One of the conditions for the starting of a test of the functional units is that there is no more work on either level A or level B as these levels must not be interrupted for the detail test. On the other hand, the test program should suitably be carried out when the program on level C can be started for it has priority before the usual level C program. The condition for starting of the usual program on level C is that the flip-flop VB of the B-field is set to 0, i.e. that all the working bits in the B- field are set to 0. The same condition is valid for the starting of the detail test program but this latter has priority before the usual C program. Thus if the flip-flop V*fc* indicates a fault the test program is started instead of the normal program on level C.

Figure 12:
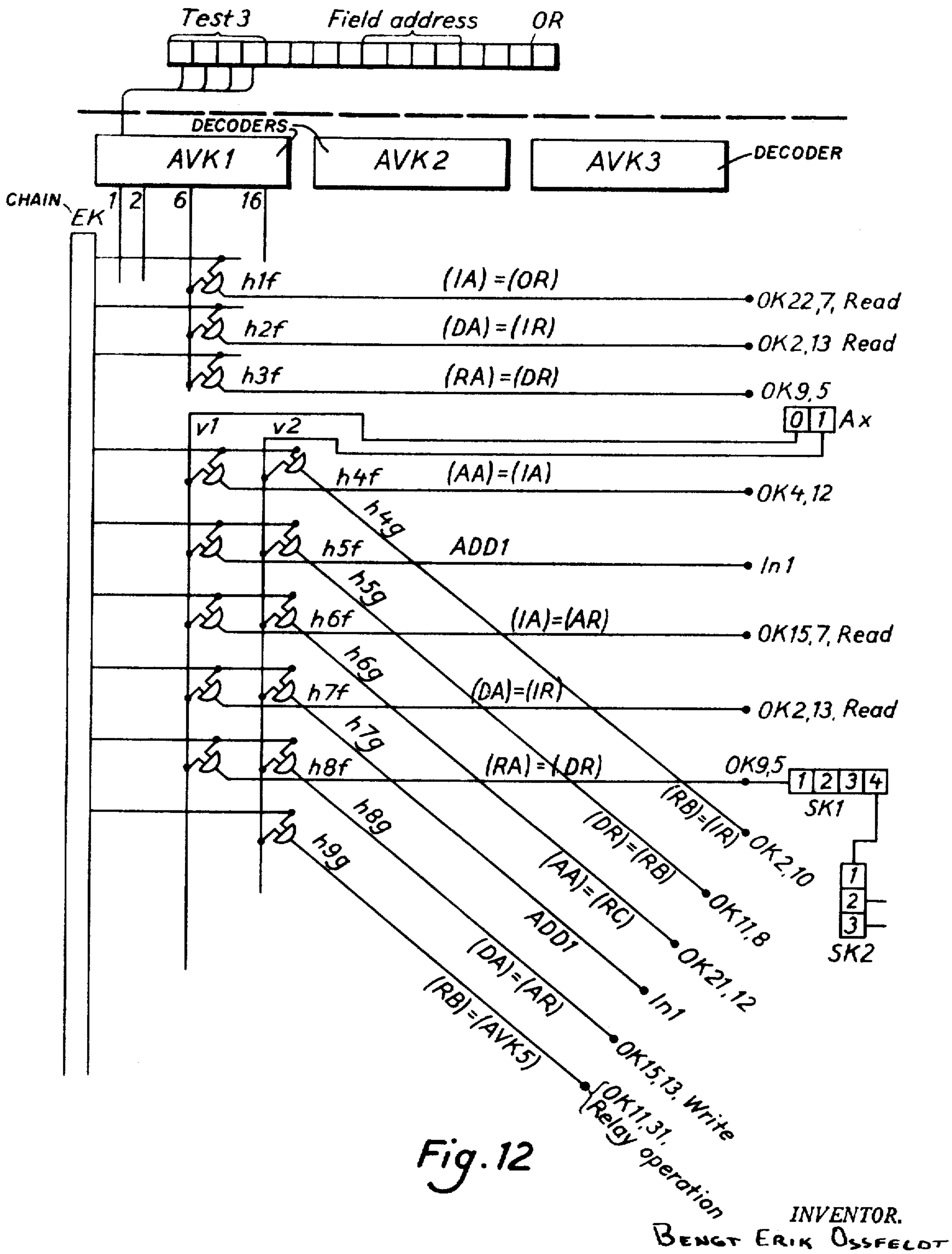
FIG. 12 shows the function of the control unit of the computer upon the execution of a section in the fault localizing program.

This is symbolized in FIG. 2 by means of a logical connection. The and-circuits OP and OS each have two outputs one of which of both and-circuits is connected to the 0-position of the flip-flop VB since activating of both and-circuits is a consequence of the fact that there is no more work on level B. The other input of the circuit OP is the output from the 0-position of the flip-flop V*fc* which signifies that the and-circuit OP starts to function when the program on level B has been concluded and no fault exists. Therefore, the address is selected indicating where the next problem on level C is stored in the data memory DM. The problem is read out and transferred from the register DR to the central unit CE so that the normal work on level C continues. The other input of the circuit OS is connected to the 1-position of the flip-flop V*fc*, i.e. it becomes active when there is a fault while the circuit OP cannot be conducting. Consequently the fault localizing program of the computers is started. By means of the conductor *os* an address in the address register IA of the instruction memory IM is selected to determine a test instruction and simultaneously a signal is fed to a decoder AVK5. Decoder AVK5, upon the receiving of this signal activates a certain relay combination, e.g. the relays R2*b*, R5*b*, R6*b*. These relays upon their operation cause the connection of memory DM of computer B to the common conductor of computer A while instruction memory IM and transfer unit FE are completely disconnected. Furthermore reading out takes place in the faultless computer of the existing information as the indicated address and the contents of instruction register IR is transferred to the order register OR by opening the and-circuits OK2 and OK16. The same address which was recorded in register IA is also transferred to the central unit CE and is stored there in the register RC by opening the and-circuits OK3 and OK20 (compare FIG. 12). The instruction word for the fault localizing test is now recorded in the order register OR as symbolized in FIG. 12 and the test is carried out by the microprogram in a similar way as described in connection with FIGS. 7 and 8. For fault localizing, the output No. 6 of the decoder AVK1 is activated and the outputs of the stepping forward chain EK are activated sequentially as earlier described. By activating the conductor *h*1*f* gates OK22 and OK7 are opened and the contents of register OR is transferred to register IA so that part of the contents, e.g. the digit position 5–8, shall be used as an address and the reading instruction is emitted in order to transfer the contents on said address to register IR. The contents of register IR is a new address which is used for a test of memory DM and is selected in such a way that the reading of the information being found at the address gives an answer that a fault of a definite type is found in the respective functional unit, according to the example in memory DM. The address can be, e.g. 0101010101010101 and the existing information on this address can be 1010101010101010. The relation between the address and the information found in this address is selected in such a way that after the lowest possible number of operations the whole body of fault types in the tested functional unit appears. The contents of register IR is now transferred to register DA by opening the and-circuits OK2 and OK13. The circuit OK13 is opened, however, even in the computer B, whose data memory DM is connected to the 16-wire line *f*1*a* of the computer A by means of the control unit SE of the computer A. Reading out takes place in the memory DM of both computers so that the read information is transferred to the result register DR of both computers and a comparison must be carried out if the binary word is equal in the two registers DR. This can take place in such a way that well as in computer A as in computer B in which register DR is still connected to the interconnection line *f*1*b* of computer B the gate OK9 is opened so that the contents of both result registers DR is fed to the comparison circuit and compared there. If the comparison indicates that there is no difference and that the flip-flop A*x* is in the 0-position (FIGS. 2 and 12). The examination continues and as symbolized in FIG. 12 the information in register IA shall now be used to obtain the next address by increasing it by 1. For this purpose the contents of register IA is transferred to register AA by activating the conductor *h*4*f* and opening the gates OK4 and OK12. The next stage is the addition of 1 to the contents of register AA, and the obtained result is, by opening the gates OK15 and OK7, transferred to register IA where it constitutes the next instruction address. Reading out takes place and the instruction associated with the address is obtained in register IR. From here it is transferred to register DA by opening the gates OK2 and OK13. Reading out takes place and the contents of register DM of the computers A and B shall be compared in the same way as during the preceding test, i.e., the computer A activates the gate OK9 in both computers so that the contents of memory DM in the respective computers is fed to the 16-wire conductor of the computers for comparison. If there is no deviation the comparison continues a definite number of times in the same way and if no deviation has been found after these stages the computer passes on to test of the next functional unit, i.e. memory IM or FE which are tested in the same way as described above. Said process is diagrammatically symbolized in FIG. 2 and FIG. 12. At the conclusion of every cycle (the conductors *h*4*f*–*h*8*f* in FIG. 12) a pulse is obtained when the gate OK9 is opened and a shift register SK1 is stepped forward one step. After a certain number of steps, e.g. 4, an output pulse is obtained from the shift register SK1 and another shift register SK2 is stepped forward one stage (FIGS. 2 and 12). This implies that the next input of the decoder AVK5 is activated which causes those relays to operate to bring about the connection of the instruction memory IM of the computer B for co-operation with the computer A. It will be a similar process when a certain number of cycles has been concluded without encountering any inequality and the shift register SK2 is stepped forward to the position 3 and the transfer unit FE of the computer B is connected for co-operation with computer A. If now any inequality has been found, either the central unit of the computer B was faulty or that the fault was temporary.

If it has appeared upon a test of any of the function units, e.g. memory DM, that an inequality exists and the flip-flop has been set to 1 another process is started which in FIG. 12 is symbolized by the crossing points between the outputs of the stepping forward chain EK and a conductor $v2$ which is connected to the "1"-output of the flip-flop $Ax$. After the discovery of the fault the address at which a fault has been obtained in memory DM must be read out to activate operating means and must be stored for use later on. For this purpose said address is first transferred from register IR to register RB by opening the gates OK2 and OK12 (the conductor $h4gt$ is activated) where it is maintained until it has been used for the operation of connecting and disconnecting means for it even defines the functional unit in which the fault has appeared. The address where the fault has been found shall, however, also be stored in the data memory for use later on for a more exact fault localizing and therefore the contents of register RB is also transferred to memory DR by opening the gates OK11 and OK8.

As mentioned in connection with the starting of the test process the instruction address for the test has been stored in the register RC by activating the gates OK3 and OK20 (see FIG. 2). This address is increased by 1 so that a storing address is obtained where the information concerning the location of the fault can be stored in memory DM. The address in register RC is fed to register AA by opening the gates OK21 and OK12 and then the contents of register AA is increased by 1 and the result is obtained in register AR. The contents of register AR is now transferred to the address register DA of the data memory DM by opening the gates OK15 and OK13. It shall be pointed out that the address at which the fault has been obtained still exists in register DR to which it has been transferred from register RB. When now simultaneously with the transfer of the storing address from register AR to register DA a writing order is fed to DM the contents of register DR is recorded in this storing address. Now those operations must be carried out which disconnect the faulty functional unit IM, DM or FE and connect all faultless functional units and also CE central of the computer B for co-operation with computer A. The function of the computers continues in the same way as before the indication of the fault but with the difference that instead of the faulty functional unit, e.g. memory DM, the faultless one used by both computers commonly. Owing to this there is still a possibility of fault control by means of a comparison between the appearing values on the interconnection lines of the respective computers except, of course, in the case that the fault should rise in memory DM. To obtain this the next stage of the microprogram will be that the contents of register RB is read out and fed to the decoder AVK4 by opening the gates OK11 and, e.g. OK31 (FIG. 2) if it was the question about the faulty memory DM. Owing to this an output signal is obtained from the and-circuit OK31 and this is fed to the decoder AVK5 which in correspondence with the obtained signal operates the relay $R4b$ which disconnects the faulty memory DM.

The invention is of course not limited to the described embodiment and it is obvious that neither the normal program of the computers nor their test program has anything to do with the invention itself. The essential matter is that the functional units of the faulty computer are connected sequentially for co-operation with the faultless computer until an inequality appeared, after which the faulty functional unit is disconnected and the remaining ones continue their normal function.

I claim:

1. I a system comprising two computers, one of said computers including a first central processing unit and a plurality of memory units connected to said central processing unit via a first data transfer bus, the other of said computers including a second central processing unit identical to said first central processing unit and a plurality of memory units identical to the memory units of said first computer and connected to said second central processing unit via a second data transfer bus, said computers working in parallel and independently of each other while simultaneously performing the same processing steps on the same data; a method of localizing a fault in one of the units of one of said computers comprising the steps of continuously monitoring the data flowing through said transfer buses, upon detection of a first difference between the data flowing through said first data transfer bus and said second data transfer bus causing each of said computers to perform the same given calculation having a specific result, checking the result of the said given calculation by each of said computers to indicate which computer has a faulty unit and which computer has faultless units, sequentially connecting each unit of the computer having a faulty unit in parallel with the corresponding unit of the computer having faultless units while the latter computer performs further calculations, and monitoring the data flowing from the units connected in parallel for a second difference, the unit of said computer having a faulty unit connected in parallel with said computer having faultless units when said second difference is detected being the faulty unit.

2. The method of claim 1 and further comprising disconnecting said faulty unit from its associated data transfer bus and connecting the corresponding unit of the other computer to said associated data transfer bus so as to operate with the computer which had said faulty component so that said computers can operate in parallel with at least one common unit.

3. The method of claim 1 and further comprising causing each of said computers to perform a still further same calculation if no second difference is detected, and monitoring for a third difference in the results of said still further calculation by said computers, if said third difference is detected the faulty unit is a central processing unit and then disconnecting the faulty central processing unit from its associated data transfer bus and connecting the faultless central processing unit to said associated data transfer bus so that said computers operate in parallel with a common central processing unit.

4. The method of claim 1 and further comprising causing each of said computers to perform a still further same calculation if no second difference is detected and monitoring for a third difference in the results of said still further calculation by said computers, if no third difference is detected the first difference was the result of a transient condition and said computers are returned to normal operation with all of their own units.

5. The method of claim 1 wherein said computers operate on a priority levels scheme with the performance of said given calculation by both of said computers has a higher priority level than the priority levels during faultfree operation and with the performance of said further calculations having a lower priority level than the priority levels during faultfree operation.

References Cited

UNITED STATES PATENTS

| | | | |
|---|---|---|---|
| 3,303,474 | 2/1967 | Moore et al. | 340—172.5 |
| 3,409,877 | 11/1968 | Alterman et al. | 340—172.5 |
| 2,913,179 | 11/1959 | Gordon | 235—164 |
| 3,050,251 | 8/1962 | Steele | 235—164 |
| 3,310,660 | 3/1967 | Cogar | 235—92 |
| 3,340,387 | 9/1967 | Anderson | 235—150.3 |
| 3,354,295 | 11/1967 | Kulka | 235—92 |
| 3,408,644 | 10/1968 | Kintner | 340—347 |
| 3,430,201 | 2/1969 | Kintner | 235—156 X |
| 3,252,149 | 5/1966 | Weida et al. | 340—172.5 |
| 3,377,623 | 4/1968 | Reut et al. | 340—172.5 |

(Other references on following page)

OTHER REFERENCES

Gordon, B. M., Adapting Digital Techniques for Automatic Controls-I, Electrical Manufacturing, November 1954, pp. 136–143, 332.

R. W. Downing, J. S. Nowak, and L. S. Tuomenoksa—No. 1 ESS Maintenance Plan—Bell System Technical Journal, September 1964.

Stanley K. Chao, The System Organization of MOBIDIC B, Proceedings of the Eastern Joint Computer Conference, 1959.

MALCOLM A. MORRISON, Primary Examiner

C. E. ATKINSON, Assistant Examiner

U.S. Cl. X.R.

340—172.5